(12) United States Patent
Hagawa et al.

(10) Patent No.: US 9,779,354 B2
(45) Date of Patent: Oct. 3, 2017

(54) LEARNING METHOD AND RECORDING MEDIUM

(71) Applicant: Panasonic Intellectual Property Management Co., Ltd., Osaka (JP)

(72) Inventors: Reiko Hagawa, Osaka (JP); Sotaro Tsukizawa, Osaka (JP); Yasunori Ishii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/053,642

(22) Filed: Feb. 25, 2016

(65) Prior Publication Data
US 2016/0260014 A1    Sep. 8, 2016

(30) Foreign Application Priority Data

Mar. 6, 2015  (JP) ................................ 2015-044838
Oct. 30, 2015  (JP) ................................ 2015-214657

(51) Int. Cl.
*G06N 3/00* (2006.01)
*G06N 3/08* (2006.01)
(Continued)

(52) U.S. Cl.
CPC ............. *G06N 3/08* (2013.01); *G06K 7/1482* (2013.01); *G06K 9/4628* (2013.01);
(Continued)

(58) Field of Classification Search
CPC ...... G06N 3/08; G06N 3/0454; G06N 99/005; G06N 3/02; G06K 9/6267; G06K 9/6282;
(Continued)

(56) References Cited

U.S. PATENT DOCUMENTS 5,247,584 A * 9/1993 Krogmann .............. G01S 7/417
382/107
5,311,600 A * 5/1994 Aghajan .............. G06K 9/4604
382/156
(Continued)

FOREIGN PATENT DOCUMENTS

JP    EP 2833295 A2 *  2/2015  ........... G06N 3/0454

OTHER PUBLICATIONS

The Extended European Search Report dated Dec. 22, 2016 for the related European Patent Application No. 16157040.3.
(Continued)

*Primary Examiner* — Manav Seth
(74) *Attorney, Agent, or Firm* — Greenblum & Bernstein, P.L.C.

(57) ABSTRACT

Learning method includes performing a first process in which a coarse class classifier configured with a first neural network is made to classify a plurality of images given as a set of images each attached with a label indicating a detailed class into a plurality of coarse classes including a plurality of detailed classes and is then made to learn a first feature that is a feature common in each of the coarse classes, and performing a second process in which a detailed class classifier, configured with a second neural network that is the same in terms of layers other than the final layer as but different in terms of the final layer from the first neural network made to perform the learning in the first process, is made to classify the set of images into detailed classes and learn a second feature of each detailed class.

11 Claims, 17 Drawing Sheets

(51) Int. Cl.
*G06K 7/14* (2006.01)
*G06N 3/04* (2006.01)
*G06K 9/62* (2006.01)
*G06K 9/46* (2006.01)
*G06N 3/02* (2006.01)

(52) U.S. Cl.
CPC .......... *G06K 9/6267* (2013.01); *G06K 9/6281* (2013.01); *G06K 9/6282* (2013.01); *G06N 3/0454* (2013.01); *G06N 3/02* (2013.01); *G06T 2207/20081* (2013.01)

(58) Field of Classification Search
CPC ................ G06K 7/1482; G06K 9/6217; G06T 2207/20081; G05B 2219/33018; G05B 2219/39311
See application file for complete search history.

(56) References Cited

U.S. PATENT DOCUMENTS

| | | | | |
|---|---|---|---|---|
| 5,359,699 A | * | 10/1994 | Tong | G06N 3/08 382/159 |
| 5,619,619 A | * | 4/1997 | Shinohara | G06F 3/011 706/11 |
| 5,796,923 A | * | 8/1998 | Ueda | G06N 3/08 706/25 |
| 5,995,651 A | * | 11/1999 | Gelenbe | G06K 9/66 382/155 |
| 6,009,418 A | * | 12/1999 | Cooper | G06N 3/0454 706/15 |
| 6,549,661 B1 | * | 4/2003 | Mitsuyama | G06K 9/00127 356/39 |
| 6,650,779 B2 | * | 11/2003 | Vachtesvanos | G01N 21/956 348/88 |
| 7,016,885 B1 | * | 3/2006 | Mikhael | G06K 9/52 382/115 |
| 7,272,261 B2 | * | 9/2007 | Wang | G06K 9/00456 382/224 |
| 7,295,687 B2 | * | 11/2007 | Kee | G06K 9/00281 340/5.53 |
| 7,440,600 B2 | * | 10/2008 | Menhardt | G06T 7/0012 382/128 |
| 7,555,155 B2 | * | 6/2009 | Levenson | G06K 9/6247 356/36 |
| 7,620,819 B2 | * | 11/2009 | Phoha | G06F 21/32 382/115 |
| 7,752,151 B2 | * | 7/2010 | Nugent | G06N 3/063 706/15 |
| 8,199,999 B2 | * | 6/2012 | Hoyt | G01N 1/30 382/133 |
| 9,129,190 B1 | * | 9/2015 | Ranzato | G06K 9/6257 |

OTHER PUBLICATIONS

Jeff Donahue et al: "DeCAF: A Deep Convolutional Activation Feature for Generic Visual Recognition", Oct. 5, 2013 (Oct. 5, 2013), XP055326544, Retrieved from the Internet: URL:http://www.jmlr.org/proceedings/papers/v32/donahue14.pdf.

Zhicheng Yan et al., "HD-CNN: Hierarchical Deep Convolutional Neural Network for Image Classification", Under review as a conference paper at ICLR 2015, URL:http://arxiv.org/pdf/1410.0736v2.pdf , Dec. 2014.

* cited by examiner

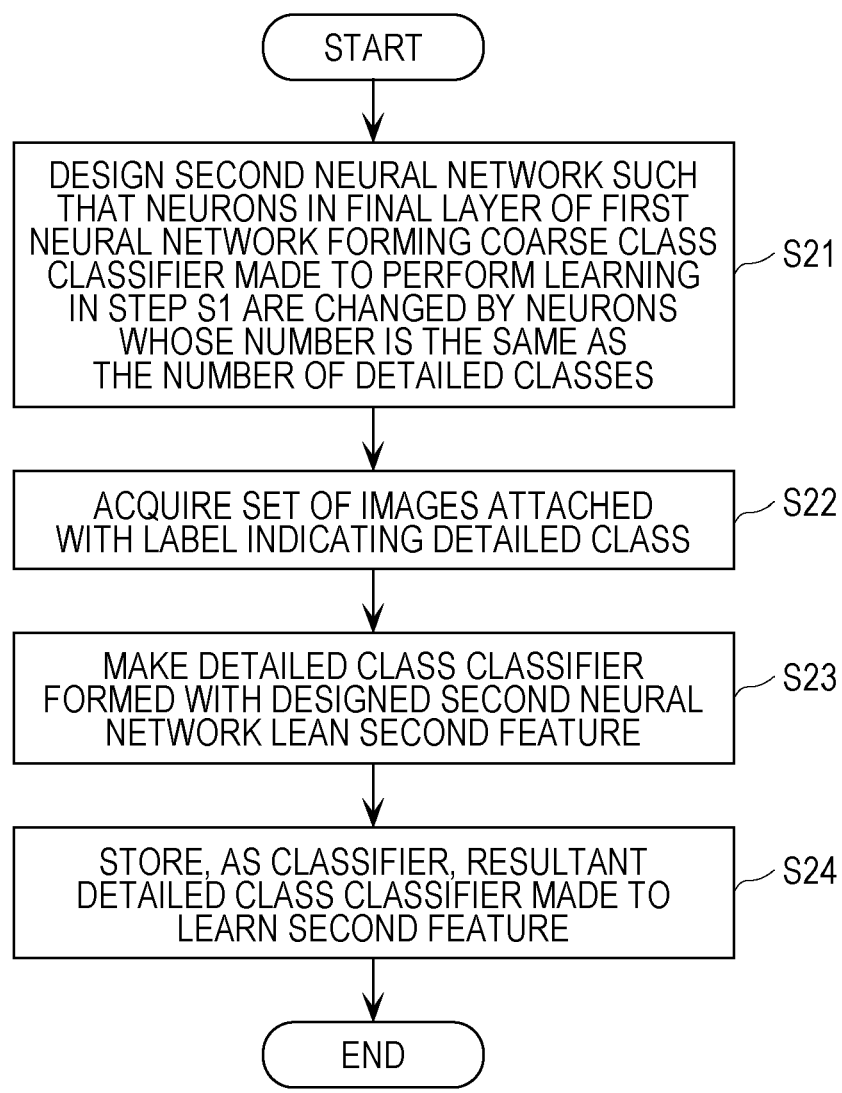

LEARNING METHOD AND RECORDING MEDIUM

BACKGROUND

1. Technical Field

The present disclosure relates to a learning method and a recording medium, and more particularly, to a method of learning a classifier including a neural network and configured to classify images and a recording medium therefor.

2. Description of the Related Art

In recent years, there has been a need for a technique for quickly and accurately recognizing various objects by using an image recognition technique that is a technique for recognizing what kind of object is included at which location on an image. For example, Z. Yan, V. Jagadeesh, D. DeCoste, W. Di and R. Piramuthu, "HD-CNN: Hierarchical Deep Convolutional Neural Network for Image Classification" (Under review as a conference paper at ICLR 2015, URL: http://arxiv.org/pdf/1410.0736v2.pdf, December 2014) (hereinafter referred to simply as NPL 1) discloses an image recognition technique capable of performing a high-accuracy image recognition using a plurality of convolutional neural network classifiers.

SUMMARY

In one general aspect, the techniques disclosed here feature that a method of learning a classifier for classifying an image includes performing a first process in which a coarse class classifier configured with a first neural network is made to classify a plurality of images given as a set of images each attached with a label indicating a detailed class into a plurality of coarse classes including a plurality of detailed classes and is then made to learn a first feature that is a feature common in each of the coarse classes, and performing a second process in which a detailed class classifier is made to classify the set of images into a plurality of detailed classes and is then made to learn a second feature that is a feature common in each of the detailed classes, the detailed class classifier configured with a second neural network that is the same in terms of layers other than a final layer as, but different in terms of the final layer from, the first neural network made to perform the learning in the first process.

The present disclosure makes it possible to realize a method of learning a classifier capable of accurately recognizing an image with an improved image recognition processing speed, a recording medium therefor, and the like.

It should be noted that general or specific embodiments may be implemented as a system, a method, an integrated circuit, a computer program, a computer-readable storage medium such as a CD-ROM disk or like, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a flow chart illustrating an example of a detailed process of step S2 in FIG. 5;

DETAILED DESCRIPTION

Underlying Knowledge Forming Basis of the Present Disclosure

The image recognition technique generally includes following two steps:

1) Extraction process to extract a feature value from an image; and
2) Discrimination process to discriminate an object based on the feature value. For example, in the extraction process, a feature value such as a luminance distribution, a luminance difference (edge), or the like used in the recognition is extracted from an object to be recognized in an image.

On the other hand, in the discrimination process, for example, a determination is made based on the extracted feature value as to whether the object is that to be recognized by using a statistical matching learning method such as boosting, SVM (Support Vector Machine), or the like.

Conventionally, a feature value extraction filter used in the extraction process is designed manually. In recent years, image capturing environments have been established, and it has become possible to practically collect a large amount of learning data via the Internet. Furthermore, infrastructure has been established in terms of large-scale computer environments such as GPU or the like. Thus investigation has been performed on methods of automatically designing a feature value extraction filter. One of such methods is called deep learning. In particular, in the field of the image recognition, investigation has been performed on a convolutional neural network in which a feature value extraction filter is used in a convolutional filtering process on a two-dimensional image. Of various deep learning techniques, the convolutional neural network, is suitable for image recognition.

Figure 16:
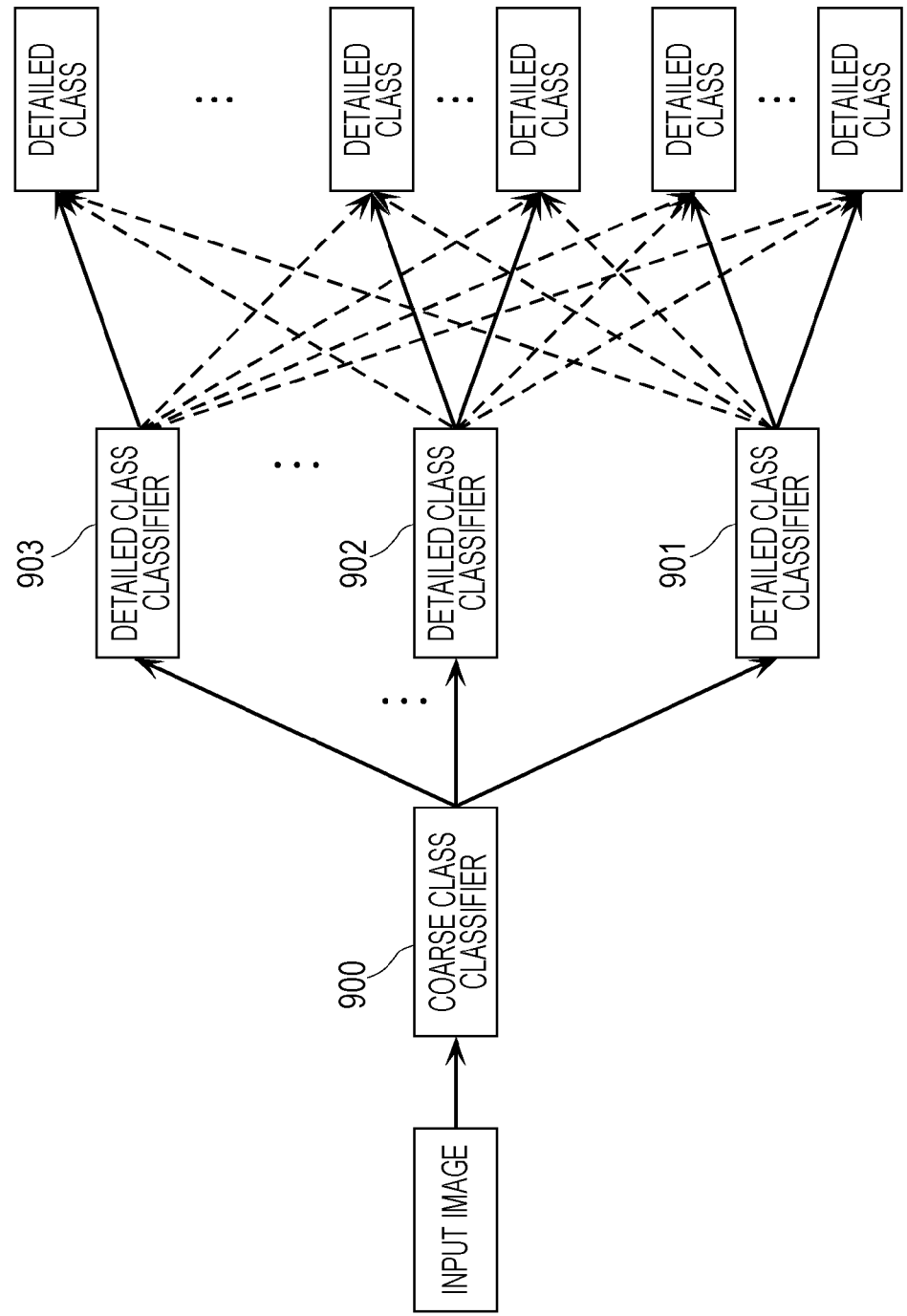
FIG. 16 is a diagram illustrating a configuration of a conventional classifier and a conventional learning method.

NPL 1 discloses techniques associated with a configuration of a classifier and a learning method using deep learning. Referring to FIG. 16, the classifier disclosed in NPL 1 is described below. FIG. 16 is a diagram illustrating a configuration of a conventional classifier and a conventional learning method.

The classifier shown in FIG. 16 includes a coarse class classifier 900 and detailed class classifiers 901, 902, and 903. Note that the detailed class classifier is also called a fine class classifier. The coarse class classifier 900 is a classifier that coarsely classifies objects into coarse classes, for example, a dog, a cat, and the like. The detailed class classifiers 901, 902, and 903 are classifiers that classify objects into detailed classes, for example, Shiba dog, corgi dog, tortoiseshell cat, and the like. By making the detailed class classifiers 901, 902, and 903 perform learning particular classes, it is possible to obtain capabilities of such detailed class classification.

In the classifier shown in FIG. 16, as described above, the detailed class classifiers 901, 902, and 903 that perform the detailed class classification in terms of, for example, Shiba dog, corgi dog, tortoiseshell cat, and the like are connected to an output of the coarse class classifier 900 that performs the coarse class classification in terms of, for example, dog, cat, and the like. In the classifier shown in FIG. 16, for example, when an image of a corgi dog is given as an input image, the coarse class classifier 900 recognizes that the image is of a dog. After that, a detailed class classifier having high ability in terms of classification of a dog class is selected. More specifically, for example, the detailed class classifier 901 is selected, and the detailed class classifier 901 determines that the image is of a corgi dog.

As described above, in the technique disclosed in NPL 1, detailed class classifiers are connected to a coarse class classifier. This makes it possible to simplify problems to be solved by the coarse class classifier and the detailed class classifiers, respectively. By combining these classifiers, it becomes possible to accurately recognize images and accurately classify images.

However, in the classifier disclosed in the NPL 1, a plurality of detailed class classifiers are connected to an output of a coarse class classifier, which results in an increase in a size of a neural network (that is, an increase in the number of neurons and the number of couplings). As a result, to perform image recognition, a greater amount of calculation is needed, which results in a reduction in the processing speed of the image recognition. Furthermore, in the classifier disclosed in NPL 1, when an error occurs in the classification by the coarse class classifier, the following detailed classification process is performed by a detailed class classifier optimized for a wrong coarse class, which results in a reduction in correct answer rate in terms of the classification.

In an aspect of the present disclosure, a method of learning a classifier for classifying an image, includes performing a first process in which a coarse class classifier configured with a first neural network is made to classify a plurality of images given as a set of images each attached with a label indicating a detailed class into a plurality of coarse classes including a plurality of detailed classes and is then made to learn a first feature that is a feature common in each of the coarse classes, and performing a second process in which a detailed class classifier is made to classify the set of images into a plurality of detailed classes and is then made to learn a second feature that is a feature common in each of the detailed classes, the detailed class classifier configured with a second neural network that is the same in terms of layers other than a final layer as, but different in terms of the final layer from, the first neural network made to perform the learning in the first process.

Thus the present disclosure makes it possible to maintain the size of the neural network structure. Therefore, the present disclosure makes it possible to perform a high-accuracy image recognition without reducing a processing speed of the image recognition (classification) process compared with a processing speed of the conventional technique.

For example, the first process may include a first design process and a first learning process, the first design process including designing the first neural network so as to include as many neurons in the final layer as there are coarse classes generated based on contents of labels indicating the respective detailed classes, the first learning process including making the coarse class classifier configured with the designed first neural network acquire the set of images and learn the first feature, and the second process may include a second design process and a second learning process, the second design process including designing the second neural network such that the neurons in the final layer of the first neural network made to perform the learning in the first process are changed by neurons whose number is the same as the number of detailed classes and the resultant neural network is employed as the second neural network, the second learning process including making the detailed class classifier configured with the designed second neural network acquire the set of images and learn the second feature thereby learning the classifier.

For example, in the second design process, the second neural network may be designed such that the neurons in the final layer of the first neural network made to perform the learning in the first learning process are replaced with neurons whose number is the same as the number of detailed classes and the resultant neural network is employed as the second neural network.

For example, the detailed class classifier and the coarse class classifier each may be configured using a third neural network, and the method may further include a third design process before the first process, the third design process including designing the third neural network such that a final layer of the third neural network includes neurons whose number is equal to or greater than the sum of the number of coarse classes and the number of detailed classes, wherein in the first design process, the first neural network may be given by the third neural network but in the final layer of the third neural network, particular neurons whose number is equal to the number of coarse classes are selected and only the selected neurons are used thereby designing the first neural network so as to include as many neurons in the final layer as there are coarse classes generated based on contents of labels indicating the respective detailed classes, and in the second design process, the second neural network may be given by the third neural network but in the final layer of the third neural network, particular neurons which are different from the neurons employed as the neurons in the final layer of the first neural network and whose number is equal to the number of detailed classes are used thereby designing the second neural network obtained by changing the neurons in the final layer of the first neural network made to perform the learning in the first process by neurons whose number is equal to the number of detailed classes.

For example, the second design process may further include setting a weight of the final layer of the second neural network to a random number, the weight indicating a coupling efficiency between the final layer of the second neural network and a layer immediately in front of the final layer.

For example, the second design process may further include setting a second weight of the final layer of the second neural network based on a first weight of the final layer of the first neural network, the first weight indicating a coupling efficiency, obtained via the learning in the first learning process, between the final layer of the first neural network and the layer immediately in front of the final layer, the second weight indicating a coupling efficiency between the final layer of the second neural network and the layer immediately in front of the final layer, the second weight determined by proportionally dividing the first weight according to a relationship between the plurality of coarse classes and the plurality of detailed classes included in the plurality of coarse classes.

For example, the method may further include storing, as the classifier, the detailed class classifier made to learn the second feature in the second process.

For example, the first process may further include generating the plurality of coarse classes based on contents of labels attached to respective images in the plurality of images.

For example, the first process may further include generating the plurality of coarse classes based on similarity of each image in the plurality of images.

For example, the method may further include performing a third process in which a third coarse class classifier configured with a third neural network is made to classify the set of images into a plurality of third coarse classes including a plurality of detailed classes and is then made to learn a third feature that is a feature common in each third coarse class in the plurality of third coarse class, wherein the first process includes a first learning process in which the detailed class classifier, configured with the first neural network that is the same in terms of layers other than the final layer as but different in terms of the final layer from the third neural network made to perform the learning in the third process, is made to classify the set of images into the plurality of coarse classes and learn the first feature of each detailed class, and wherein each coarse class in the plurality of coarse classes includes a plurality of third coarse classes and thus includes a plurality of detailed classes included in the plurality of third coarse classes.

For example, at least one of the first process and the second process may be performed by a processor.

Note that embodiments described below are given by way of example only and not limitation on the scope of the present disclosure. Values, shapes, constituent elements, steps, an order of steps, etc., described in the following embodiments are given by way of example only, and not limitation on the scope of the present disclosure. Among constituent elements in the embodiments described below, constituent elements that are not included in independent claims representing highest concepts are arbitrary constituent elements. Also note that a combination of arbitrary embodiments is possible.

First Embodiment

A classifier 10 according to a first embodiment is described below as to a learning method and the like with reference to drawings.

Configuration of Learning System 1

Figure 1:
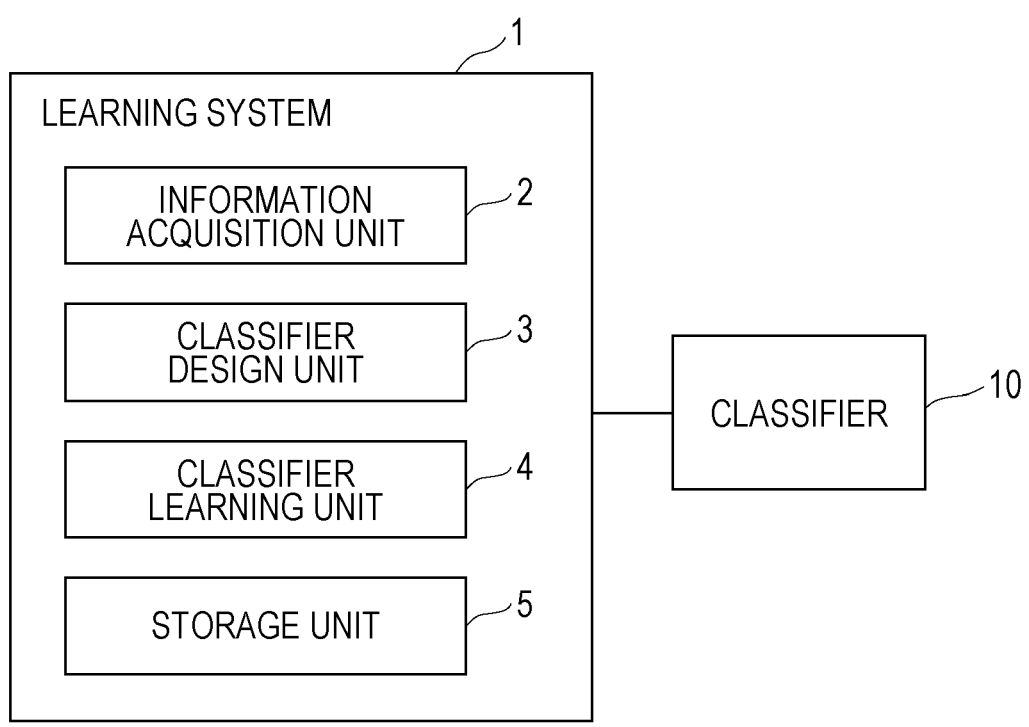
FIG. 1 is a block diagram illustrating an example of a configuration of a learning system according to a first embodiment.
Figure 2A:
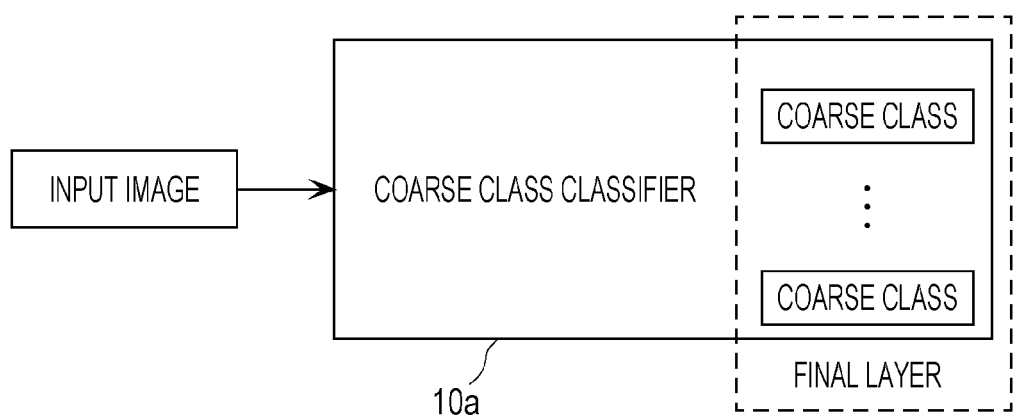
FIG. 2A is a diagram illustrating a configuration of a coarse class classifier used in a learning process performed by the learning system according to the first embodiment.
Figure 2B:
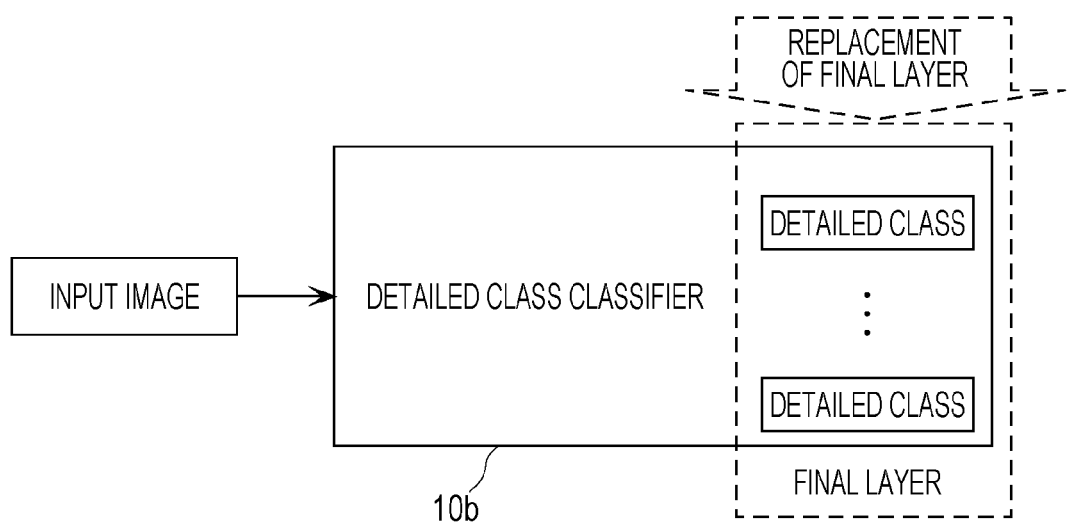
FIG. 2B is a diagram illustrating a configuration of a detailed class classifier used in a learning process performed by the learning system according to the first embodiment.
Figure 3A:
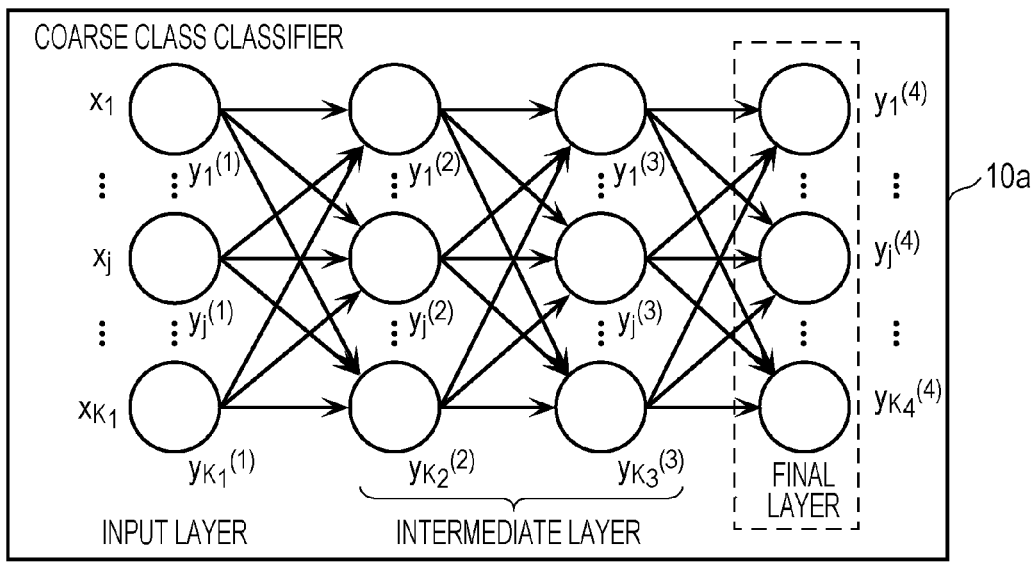
FIG. 3A is a diagram illustrating an example of a first neural network used as a coarse class classifier in FIG. 2A.
Figure 3B:
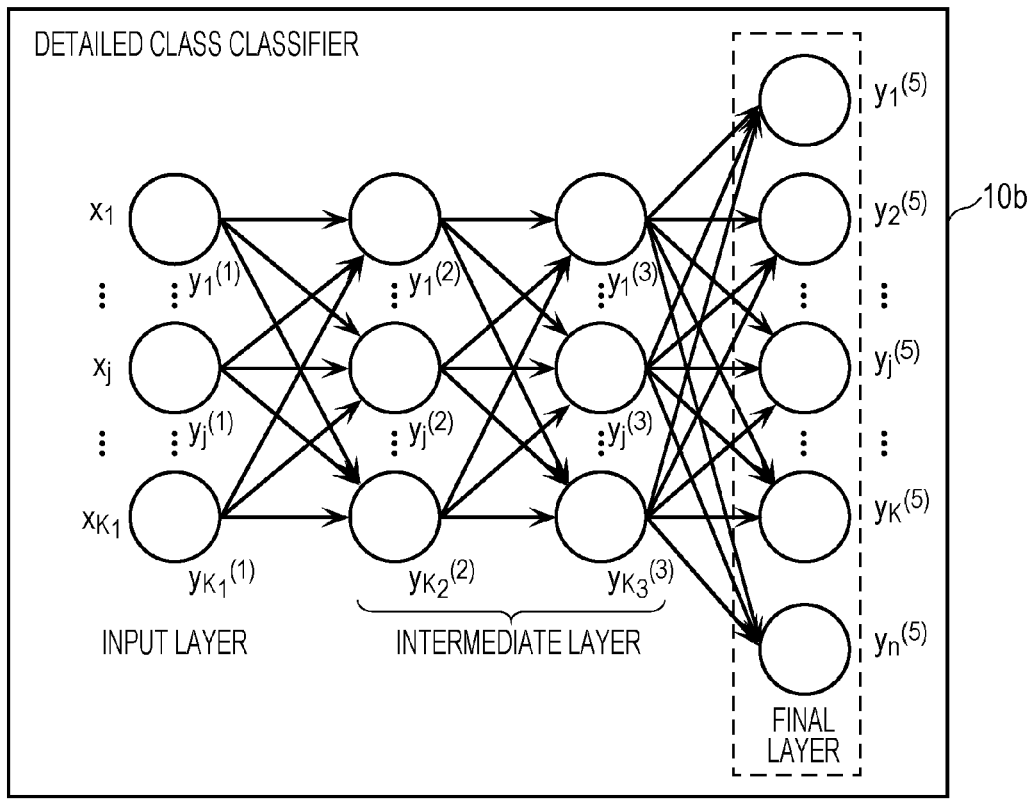
FIG. 3B is a diagram illustrating an example of a second neural network used as a detailed class classifier in FIG. 2B.

FIG. 1 is a block diagram illustrating an example of a configuration of a learning system 1 according to a first embodiment. FIG. 2A is a diagram illustrating a configuration of a coarse class classifier 10a used in a learning process performed by the learning system 1 according to the first embodiment. FIG. 2B is a diagram illustrating a configuration of a detailed class classifier 10b used in a learning process performed by the learning system 1 according to the first embodiment. Note that the detailed class classifier is also called a fine class classifier. FIG. 3A is a diagram illustrating an example of a first neural network used as a coarse class classifier 10a shown in FIG. 2A. FIG. 3B is a diagram illustrating an example of a second neural network used as a detailed class classifier 10b shown in FIG. 2B.

A learning system 1 shown in FIG. 1 includes an information acquisition unit 2, a classifier design unit 3, a classifier learning unit 4, and a storage unit 5, and is configured to learn the classifier 10 that classifies images.

The information acquisition unit 2 acquires a data set of a plurality of images (a set of images) prepared in advance, that is, a set of images each attached with a label indicating a detailed class. Furthermore, the information acquisition unit 2 acquires a coarse class classifier 10a stored in the storage unit 5, that is, a first neural network (parameters indicating a structure, a threshold value, a weight, a coupling state, and the like) used to realize the coarse class classifier 10a stored in the storage unit 5.

The classifier learning unit 4 learns the classifier 10 by performing a learning process (coarse class learning) on the coarse class classifier 10a shown in FIG. 2A and a learning process (detailed class learning) on the detailed class classifier 10b shown in FIG. 2B using a coarse-to-fine approach in the image recognition technique.

More specifically, the classifier learning unit 4 controls the coarse class classifier 10a including a first neural network designed by the classifier design unit 3 to acquire a set of images respective attached with detailed classes. The classifier learning unit 4 then controls the coarse class classifier 10a to perform coarse class learning so as to classify the set of images into a plurality of coarse classes including a plurality of detailed classes and learn a first feature that is a feature common in each of the coarse classes. The classifier learning unit 4 may store, in the storage unit 5, the coarse class classifier 10a made to perform the coarse class learning, that is, the first neural network (parameters indicating the structure, the threshold value, the weight, the coupling state, and the like) used to realize the coarse class classifier 10a.

The classifier learning unit 4 also controls the detailed class classifier 10b to acquire the set of images described above, wherein the detailed class classifier 10b is configured with a second neural network designed by the classifier design unit 3 so as to be the same in terms of layer other than the final layer as but different in terms of the final layer from the first neural network made to perform the coarse class learning. The classifier learning unit 4 then controls the detailed class classifier 10b to perform detailed class learning so as to classify the set of images into detailed classes and learn a second feature that is a feature common in each detailed class. Thereafter, the classifier learning unit 4 stores the detailed class classifier 10b made to perform the detailed class learning as the classifier 10 in the storage unit 5, that is, the classifier learning unit 4 stores the second neural network (parameters indicating the structure, the threshold value, the weight, the coupling state, and the like) used to realize the detailed class classifier 10b as the classifier 10 in the storage unit 5.

As described above, the classifier learning unit 4 employs a multi-stage (two stage, in the present example) approach in learning the classifier 10.

The classifier design unit 3 determines the number of outputs (the number of neurons) such that the number of outputs is equal to the number of detailed classes or the number of generated coarse classes, and designs the configuration and the parameters for the coarse class classifier 10a or the detailed class classifier 10b.

More specifically, the classifier design unit 3 designs the coarse class classifier 10a such that the final layer of the first neural network of the coarse class classifier 10a has as many neurons as there are coarse classes generated based on contents of labels indicating the detailed classes. In the present embodiment, the classifier design unit 3 designs the first neural network including an input layer, an intermediate layer, and a final layer, for example, as illustrated in FIG. 3A, and employs the resultant first neural network as the coarse class classifier 10a shown in FIG. 2A. Note that the number of neurons of the final layer of the first neural network is set to be equal to the number of coarse classes.

Furthermore, the classifier design unit 3 designs the second neural network such that the neurons of the final layer of the first neural network of the coarse class classifier 10a made to perform the coarse class learning are replaced by neurons whose number is equal to the number of detailed classes, and the resultant neural network is employed as the second neural network. For example, the classifier design unit 3 designs the second neural network such that the neurons of the final layer of the first neural network made to perform the coarse class learning are replaced by neurons whose number is equal to the number of detailed classes, and the resultant neural network is employed as the second neural network. In this design process, the classifier design unit 3 may employ a random value as a weight indicating a coupling efficiency between the final layer of the second neural network and a layer immediately before the final layer.

In the present embodiment, the classifier design unit 3 designs the second neural network so as to include an input layer, an intermediate layer, and a final layer, for example, as illustrated in FIG. 3B, and employs the resultant second neural network as the detailed class classifier 10b shown in FIG. 2B. Note that the second neural network is designed by replacing the final layer thereof such that the second neural network and the first neural network are the same in terms of layers other than their final layers but different only in terms of their final layers and such that the final layer of the second neural network has as many neurons as there are detailed classes. The weight indicating the coupling efficiency between the final layer of the second neural network and the layer immediately before the final layer is learned (additionally learned) when the detailed class learning is performed, and thus the weight may be set to an arbitrary value, for example, a random number.

The storage unit 5 stores the classifier 10 (the coarse class classifier 10a) made to perform the coarse class learning. That is, the storage unit 5 stores the first neural network (the parameters indicating the structure, the threshold value, the weight, the coupling state, and the like) of the coarse class classifier 10a. Furthermore, the storage unit 5 stores the classifier 10 (the detailed class classifier 10b) made to perform the detailed class learning. That is, the storage unit 5 stores the second neural network (the parameters indicating the structure, the threshold value, the weight, the coupling state, and the like) of the detailed class classifier 10b.

Figure 4:
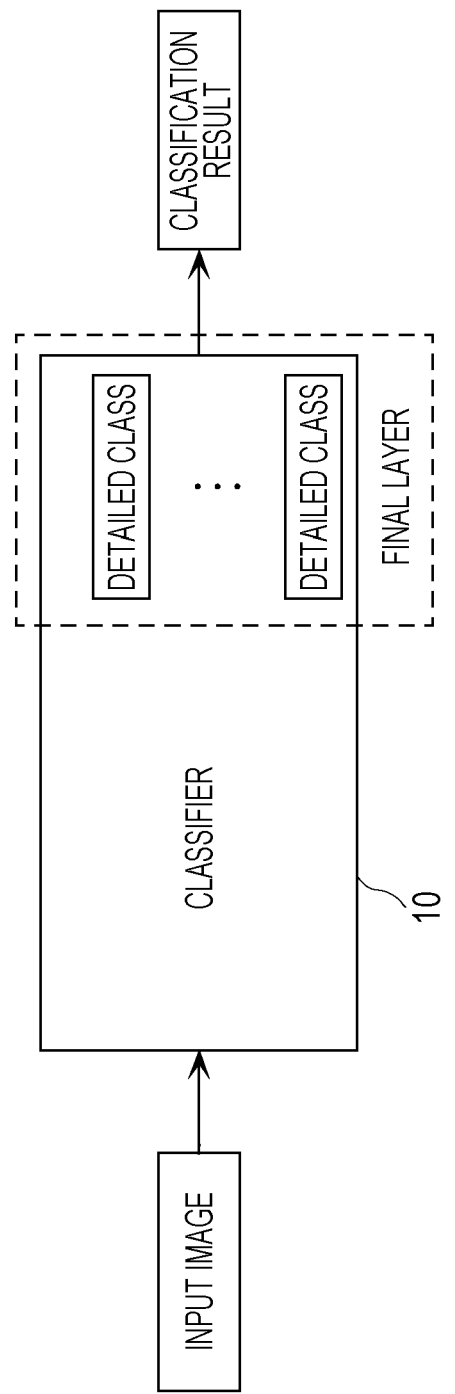
FIG. 4 is a diagram illustrating a configuration in performing a recognition process by a classifier according to the first embodiment.

FIG. 4 is a diagram illustrating a configuration in performing a recognition process by the classifier 10 according to the first embodiment. The classifier 10 is a classifier for classifying images, and more particularly, when an object to be classified (an input image) is input, the classifier 10 performs a recognition process and a classification process, and outputs a result thereof (a classification result). The classifier 10 is configured as illustrated in FIG. 4, that is, the classifier 10 is the same in configuration as the detailed class classifier 10b made to perform the detailed class learning.

As described above, the classifier 10 is configured using a neural network with a small size (in terms of the number of neurons and the number of couplings), and the learning system 1 performs multi-stage learning based on a coarse-to-fine approach in the image recognition, and thus it is possible to achieve high accuracy and high speed in the image recognition (classification).

Learning Process by Learning System 1

A learning process performed by the learning system 1 configured in the above-described manner is described below with reference to drawings.

Figure 5:
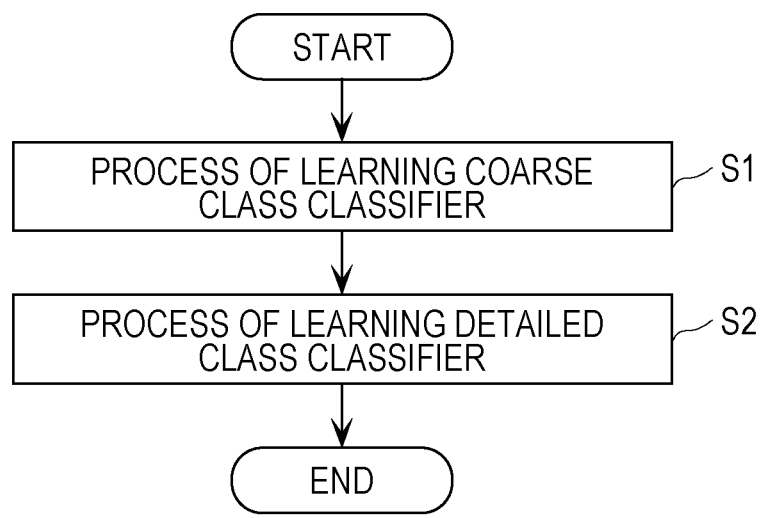
FIG. 5 is a flow chart illustrating a learning process according to the first embodiment.
Figure 6A:
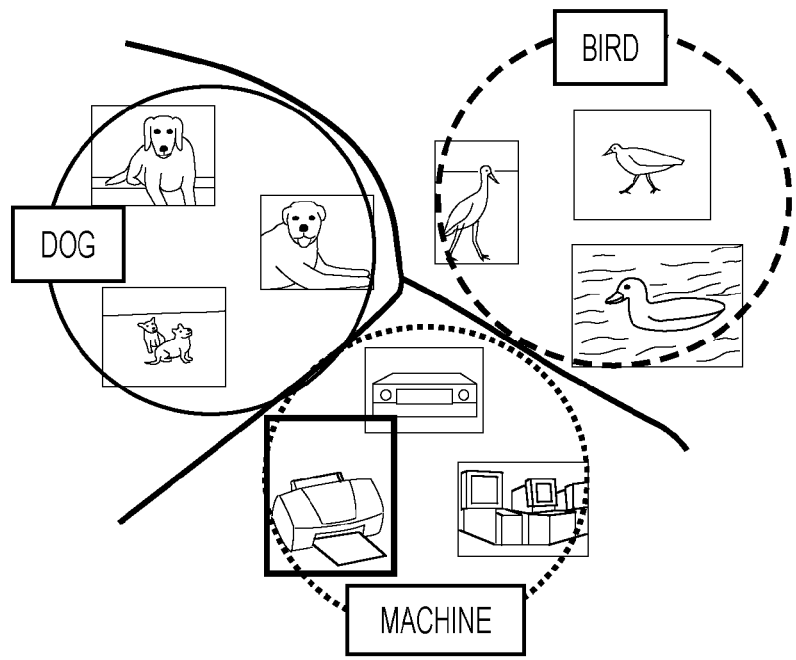
FIG. 6A illustrates an example of a result of coarse class learning according to the first embodiment.
Figure 6B:
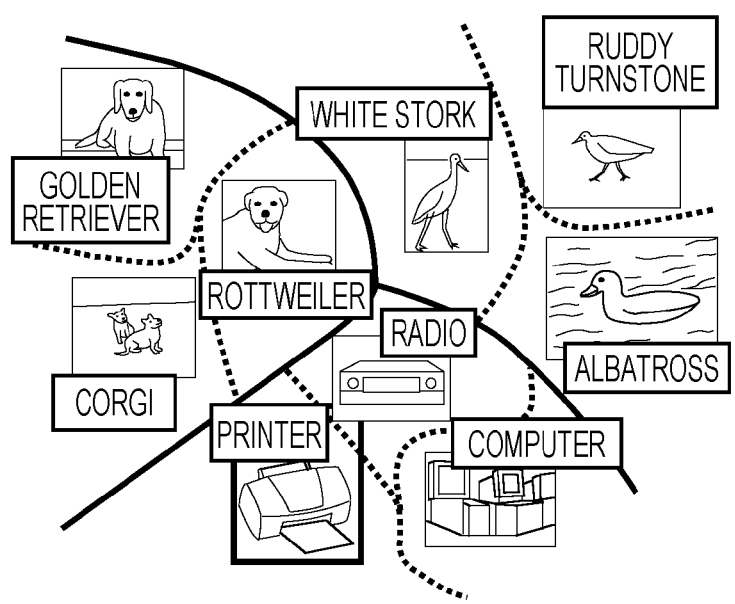
FIG. 6B illustrates an example of a result of detailed class learning according to the first embodiment.

FIG. 5 is a flow chart illustrating a learning process according to the first embodiment. In the example shown in FIG. 5, it is assumed by way of example that a 2-stage learning process is performed as the multi-stage learning process. FIG. 6A illustrates an example of a result of a coarse class learning according to the first embodiment. FIG. 6B illustrates an example of a result of a detailed class learning according to the first embodiment.

First, in step S1, the learning system 1 performs a learning process (coarse class learning) in terms of the coarse class classifier 10a.

More specifically, the learning system 1 controls the coarse class classifier 10a configured with the first neural network to classify a set of images attached with labels respectively indicating detailed classes into a plurality of coarse classes including a plurality of detailed classes, and learn a first feature that is a feature common in each of the coarse classes. More specifically, for example, as illustrated in FIG. 6A, the learning system 1 controls the coarse class classifier 10a to classify a set of images given as an image data set into coarse classes such as dog, bird, machine, etc., (that is, to determine boundaries between them), and further extract a feature (a first feature) common among images attached with labels indicating detailed classes belonging to the same coarse class. The learning system 1 then controls the coarse class classifier 10a to perform learning (coarse class learning) so as to recognize the extracted first feature.

Next, in step S2, the learning system 1 performs a learning process (a detailed class learning process) in terms of the detailed class classifier 10b.

More specifically, learning of the classifier 10 is performed by controlling the detailed class classifier 10b configured with the second neural network that is the same in terms of layers other than the final layer but different in terms of the final layer from the first neural network made to perform the learning in step S1 such that the detailed class classifier 10b classifies the set of images into detailed classes and learn a second feature that is a feature common in each of the detailed classes. For example, as illustrated in FIG. 6B, the learning system 1 controls the detailed class classifier 10b to set initial values to the set of images given as the image data set in terms of coarse classes such as dog, bird, machine and the like classified in step S1 (among which borderlines were drawn). The learning system 1 further controls the detailed class classifier 10b to divide the coarse classes into detailed classes (among which borderlines are drawn) such as corgi, Rottweiler, golden retriever, radio, printer, computer, white stork, albatross, ruddy turnstone, and the like and extract a feature (a second feature) common in each of the resultant detailed classes. The learning system 1 then controls the detailed class classifier 10b to perform learning (detailed class learning) so as to recognize the extracted second feature.

Thus, compared with the conventional classifier, it is possible to suppress an occurrence of a local solution or overlearning while maintaining a small size of the neural network structure, and thus it is possible to achieve high accuracy in the image recognition (classification) without reducing a processing speed in the image recognition.

The processes of step S1 (coarse class learning) and step S2 (detailed class learning) are described in further detail below.

Figure 7:
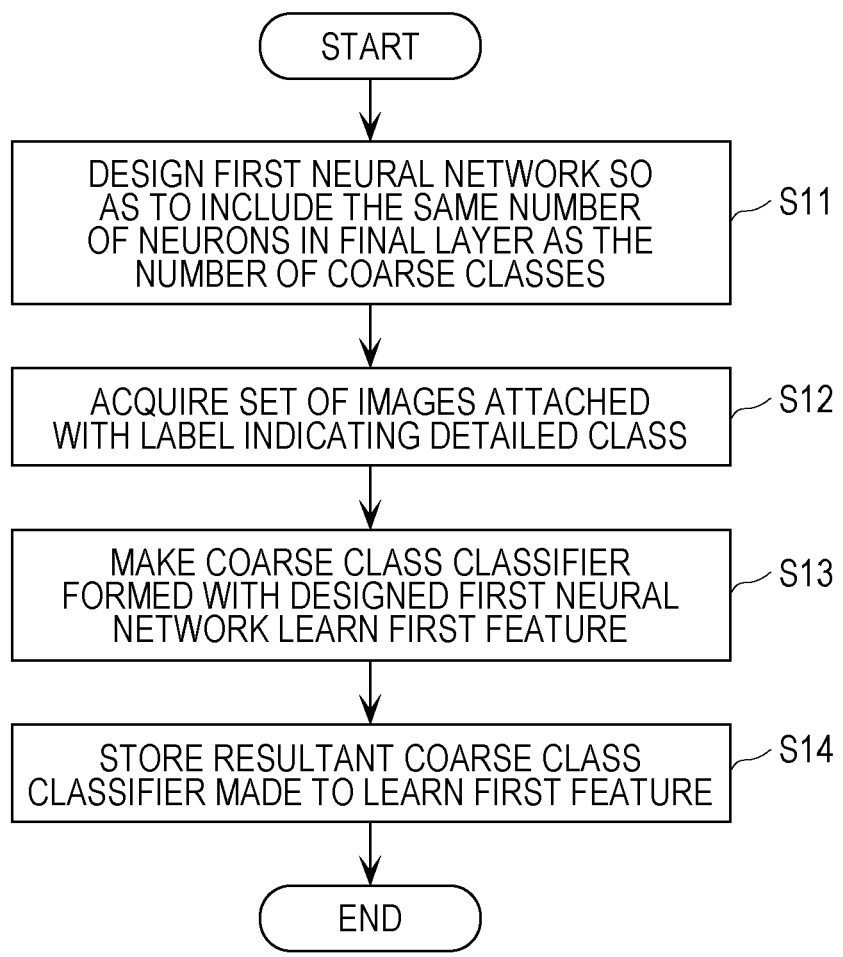
FIG. 7 is a flow chart illustrating an example of a detailed process of step S1 in FIG. 5.

FIG. 7 is a flow chart illustrating an example of the detailed process in step S1 in FIG. 5.

In step S1, first, the learning system 1 designs the first neural network in the coarse class classifier 10a such that the final layer thereof includes as many neurons as there are coarse classes generated based on contents of labels indicating the detailed classes (S11). That is, the learning system 1 designs the first neural network of the coarse class classifier 10a.

The learning system 1 then acquires a set of images each attached with a label indicating a detailed class (S12).

Next, the learning system 1 controls the coarse class classifier 10a configured with the designed first neural network to acquire the set of images and learn the first feature (S13). More specifically, the coarse class classifier 10a performs learning (coarse class learning) so as to recognize the first feature thereby learning parameters indicating a threshold value, a weight, a coupling state, and the like for the first neural network to recognize the first feature.

Next, the learning system 1 stores, in the storage unit 5, the coarse class classifier 10a made to learn the first feature in step S13, that is, the learning system 1 stores the first neural network used to realize the coarse class classifier 10a (S14).

FIG. 8 is a flow chart illustrating an example of the detailed process in step S2 in FIG. 5.

In step S2, first, the learning system 1 designs the second neural network used to realize the detailed class classifier 10b such that the neurons of the final layer of the first neural network of the coarse class classifier 10a used to realize the coarse class classifier 10a made to perform the learning in step S1 are replaced by neurons whose number is equal to the number of detailed classes and the resultant neural network is employed as the second neural network (S21).

That is, the learning system 1 designs the second neural network by directly employing the first neural network (the parameters indicating the structure, the threshold value, the weight, the coupling state, and the like) of the coarse class classifier 10a made to perform the learning in step S1 except for the final layer, and employing the resultant second neural network as the detailed class classifier 10b. The learning system 1 then changes the neurons in the final layer of the second neural network such that there are as many neurons as there are detailed classes. In the present embodiment, the learning system 1 designs the second neural network such that the neurons of the final layer of the first neural network are replaced by neurons whose number is equal to the number of detailed classes and the resultant neural network is employed as the second neural network.

Next, the learning system 1 acquires, from the outside, a set of images each attached with a label indicating a detailed class (S22). More specifically, the learning system 1 acquires the same set of images as the set of images acquired in step S12.

Next, the learning system 1 controls the detailed class classifier 10b configured with the designed second neural network to acquire the above-described set of images and learn the second feature (S23). More specifically, the detailed class classifier 10b performs learning (detailed class learning) so as to recognize the second feature thereby learning parameters indicating a threshold value, a weight, a coupling state, and the like for second neural network to recognize the second feature.

Next, the learning system 1 stores the detailed class classifier 10b made to learn the second feature in step S23 as the classifier 10 in the storage unit 5. That is, the learning system 1 stores the second neural network (the parameters indicating the structure, the threshold value, the weight, the coupling state, and the like) used to realize the detailed class classifier 10b as the classifier 10 in the storage unit 5 (S14).

Effects

As described above, the first embodiment makes it possible to realize the method of learning the classifier capable of performing high-accuracy image recognition without reducing a processing speed in the image recognition compared with a processing speed of the conventional technique. More specifically, in the learning method according to the first embodiment, the detailed class classifier 10b is made to learn detailed classes such that an initial value of the learning is given by a result of the coarse class learning performed by the coarse class classifier 10a configured with the neural network that is the same as the detailed class classifier 10b except for the final layer (that is, the multi-stage learning is performed). That is, in the classifier 10 (including the coarse class classifier 10a and the detailed class classifier 10b) according to the present embodiment, the same neural network is used in both the coarse class learning and the detailed class learning while only changing the number of outputs (the number of neurons in the final layer) between the coarse class learning and the detailed class learning. The detailed class learning is performed using the detailed class classifier 10b configured with the neural network for which the same parameters as those obtained in the coarse class learning are set to layers other than the final layer. As described above, the multi-stage learning is performed without changing the structure of the layers, other than the final layer, of the neural network of the classifier 10 (that is, while maintaining the size of the layers other than the final layer). This makes it possible to suppress erroneous employment of a wrong detailed class in the classification process, which results in an improvement in image recognition accuracy. Besides, it becomes possible to reduce the size of the neural network, which allows it to increase the processing speed of the image recognition by a factor of about 4 compared with the processing speed of the conventional technique.

In the first embodiment, by way of example, the classifier 10 is configured to perform the 2-stage learning. However, the number of states in the multi-stage learning may be three or greater.

For example, in a case where 3-stage learning is employed, the learning system 1 controls a third coarse class classifier configured with a third neural network to classify the set of images into a plurality of third coarse classes including a plurality of detailed classes and learn a third feature that is a feature common in each of the third coarse classes. Furthermore, the learning system 1 controls the detailed class classifier 10*b* configured with the first neural network which is the same in terms of layers other than the final layer as but different in terms of the final layer from the third neural network made to learn the third feature such that the set of images are classified into the coarse classes and a first feature of each detailed class is learned. Note that when each coarse class in the plurality of coarse classes includes a plurality of third coarse classes and thus includes a plurality of detailed classes included in the plurality of third coarse classes.

By performing the coarse class classification via two or more stages in the above-described manner, the classifier 10 is allowed to perform multi-stage learning via three or more stages. This method is useful in particular when the image set includes so many images attached with labels indicating detailed classes that use of one-stage coarse class classification would results in many outputs (neurons in the final layer).

First Modification

In the first embodiment described above, it is assumed by way of example but not limitation that the learning system 1 designs the coarse class classifier 10*a* using coarse classes generated based on contents of labels indicating detailed classes. Alternatively, the learning system 1 may generate coarse classes based on contents of labels indicating detailed classes. In this case, for example, the learning system 1 may perform a learning process according to a first modification as described below.

Configuration of Learning System 1A

Figure 9A:
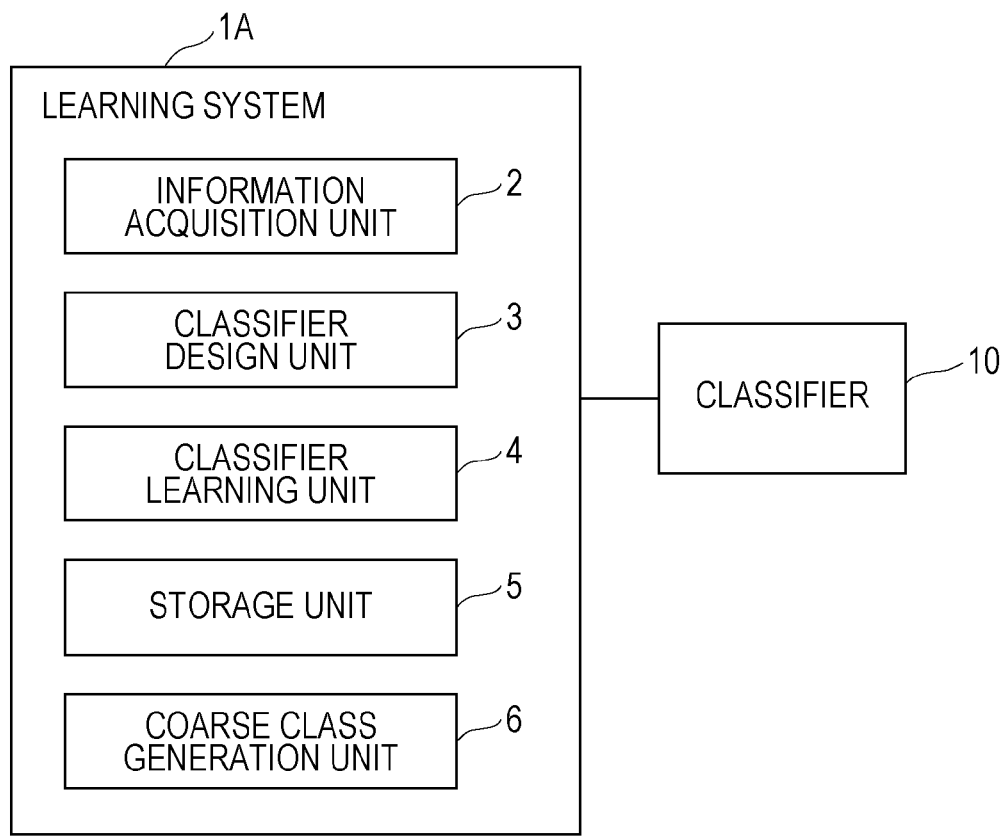
FIG. 9A is a block diagram illustrating an example of a configuration of a learning system according to a first modification.
Figure 9B:
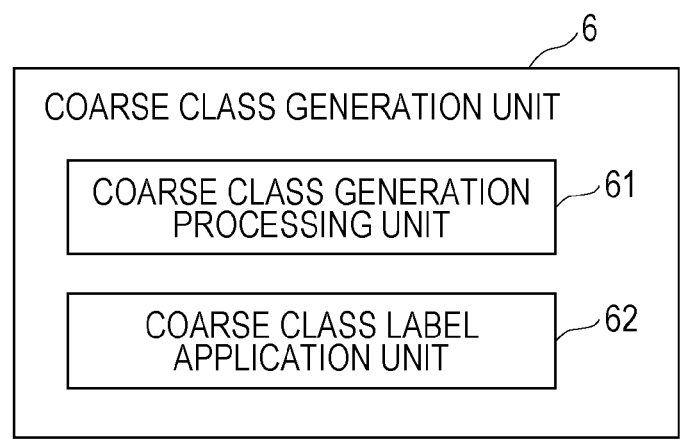
FIG. 9B is a block diagram illustrating an example of a detailed configuration of a coarse class generation unit shown in FIG. 9A.

FIG. 9A is a block diagram illustrating an example of a configuration of a learning system 1A according to the first modification. FIG. 9B is a block diagram illustrating an example of a detailed configuration of a coarse class generation unit 6 shown in FIG. 9A. Elements similar to those in FIG. 1 are denoted by similar reference numerals, and a further description thereof is omitted.

The learning system 1A shown in FIG. 9A is different in configuration from the learning system 1 shown in FIG. 1 in that the learning system 1A additionally includes a coarse class generation unit 6.

The coarse class generation unit 6 generates a plurality of coarse classes based on contents of labels indicating detailed classes assigned to respective images in the image set described above. Alternatively, the coarse class generation unit 6 may generate a plurality of coarse classes based on similarity of each image in the image set described above.

Configuration of Coarse Class Generation Unit 6

In the present modification, the coarse class generation unit 6 includes, for example, a coarse class generation processing unit 61 and a coarse class label application unit 62, as shown in FIG. 9B.

The coarse class generation processing unit 61 may perform, for example, unsupervised clustering to classify a plurality of images given as the set of images into a plurality of coarse classes thereby generating the plurality of the coarse classes. For example, the coarse class generation processing unit 61 classifies a plurality of images given as the image set into a plurality of coarse classes based on contents of labels indicating detailed classes attached to the respective images in the set images or based on similarity of each image in the plurality of images given as the set of images. Furthermore, the coarse class generation processing unit 61 generates names or the like uniquely identifying the respective obtained coarse classes. That is, the coarse class generation processing unit 61 is capable of generating the plurality of coarse classes in the above-described manner.

The coarse class label application unit 62 attaches labels indicating coarse classes classified by the coarse class generation processing unit 61 to the respective images given as the set of images attached with labels indicating detailed classes.

Learning Process by the Learning System 1A

Next, referring to drawings, a description is given below as to a learning process performed by the learning system 1A configured in the above-described manner. The two-stage learning process performed by the learning system 1A is similar to that described above with reference to FIG. 5, and the detailed process of the detailed class learning (step S2) is similar to that described above with reference to FIG. 8, and thus further descriptions thereof are omitted. Thus the following description is focused on differences from the first embodiment.

Figure 10A:
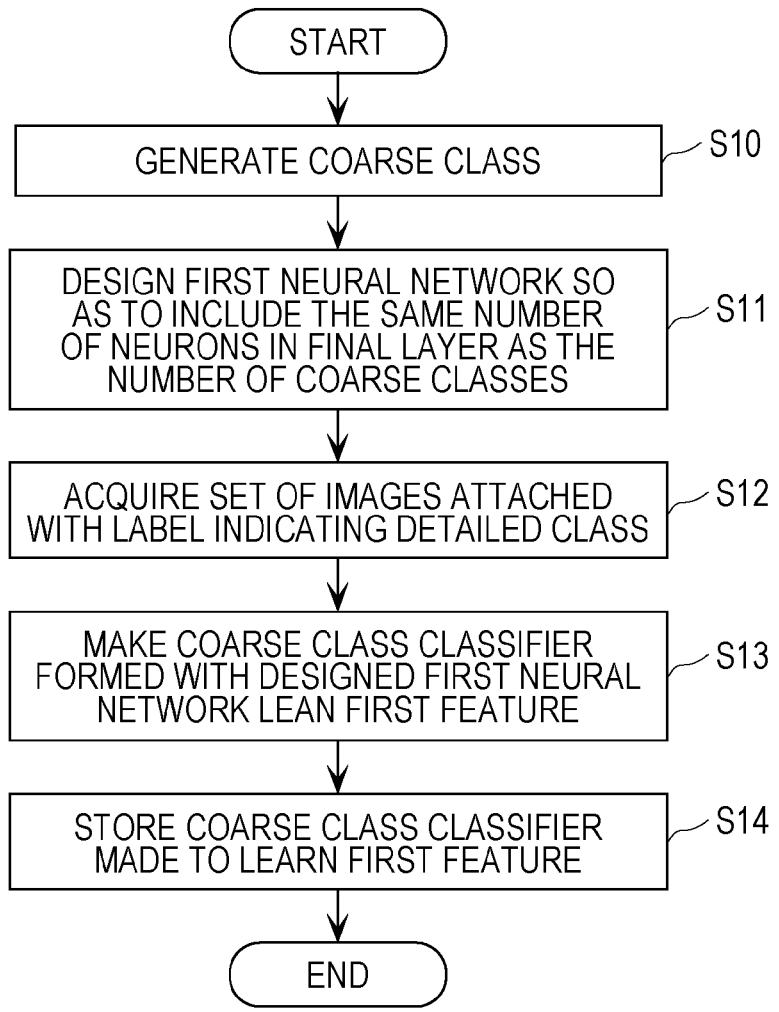
FIG. 10A is a flow chart illustrating an example of a detailed process of coarse class learning according to the first modification.
Figure 10B:
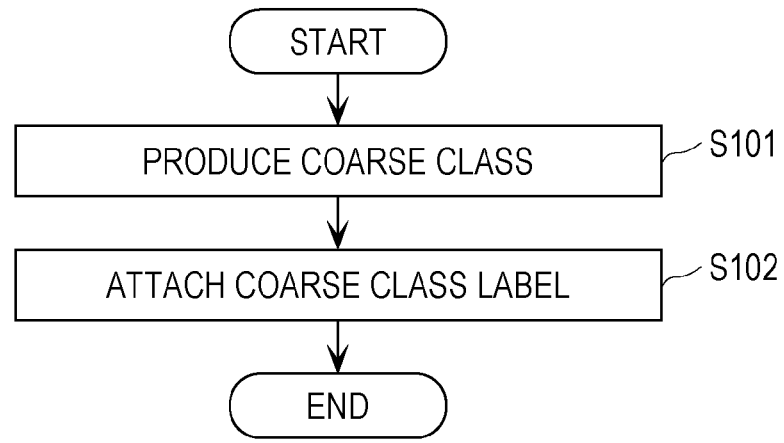
FIG. 10B is a flow chart illustrating an example of a detailed process of step S10 in FIG. 10A.

FIG. 10A is a flow chart illustrating an example of a detailed process of coarse class learning (step S1) according to the first modification. FIG. 10B is a flow chart illustrating an example of a detailed process of step S10 in FIG. 10A. Elements similar to those shown in FIG. 7 are denoted by similar symbols, and a further description thereof is omitted.

The detailed process of the coarse class learning shown in FIG. 10A is different from the detailed process of the coarse class learning shown in FIG. 7 in that an additional process in step S10 is included. In step S10, the learning system 1A makes the coarse class generation unit 6 generate a plurality of coarse classes based on contents of labels indicating detailed classes attached to the respective images in the plurality of images given as the set of images set described above. Alternatively, the learning system 1A may make the coarse class generation unit 6 generate a plurality of coarse class based on similarity of each image in the plurality of images given as the image set described above.

More specifically, as illustrated in FIG. 10B, in step 10, first, learning system 1A performs a coarse class generation process (S101). In the present modification, the learning system 1A makes the coarse class generation processing unit 61 acquire, from the outside, a set of images attached with labels indicating detailed classes. The learning system 1A then makes the coarse class generation processing unit 61 classify a plurality of images in the acquired set of images into a plurality of coarse classes thereby generating the plurality of coarse classes.

Next, the learning system 1A performs a coarse class label application process (S102). In the learning system 1A according to the present modification, based on the result of the classification performed in step S101, the coarse class label application unit 62 attaches labels indicating the coarse classes classified in step S101 to the respective images in the plurality of images given as the set of images each attached with a label indicating a detailed class.

Second Modification

In the first embodiment described above, the final layer of the second neural network is designed, by way of example but not limitation, by exchanging (replacing) the final layer of the first neural network. Alternatively, the third neural network may be used as the first neural network and the second neural network such that neurons are selected from the neurons of the final layer of the third neural network and only the selected neurons are used in the final layer. In this case, neurons selected and used in the final layer are changed between the first neural network and the second neural network. This modification (that is, the second modification) is described in further detail below.

Configuration

Figure 11:
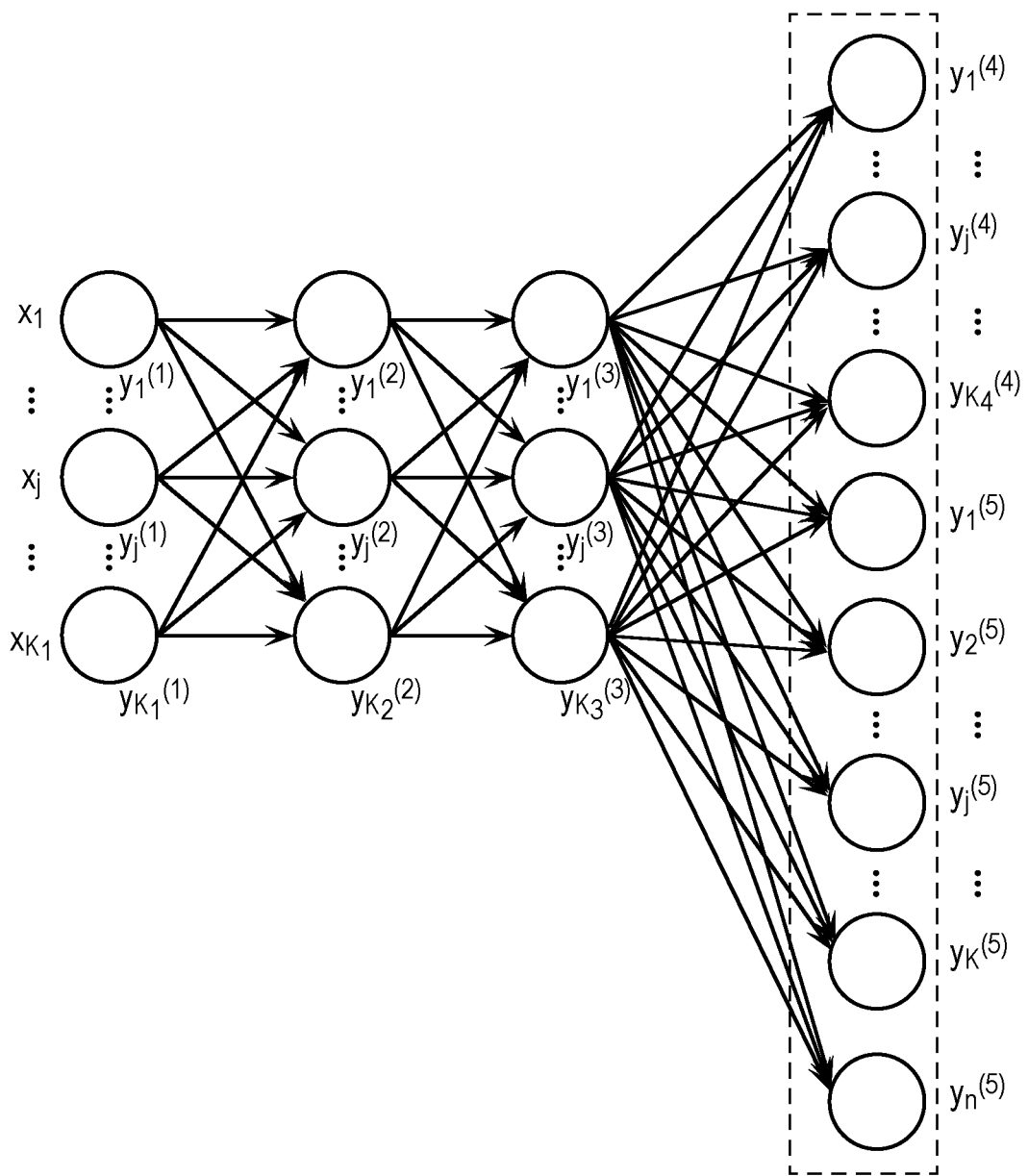
FIG. 11 is a diagram illustrating an example of a third neural network according to a second modification.
Figure 12A:
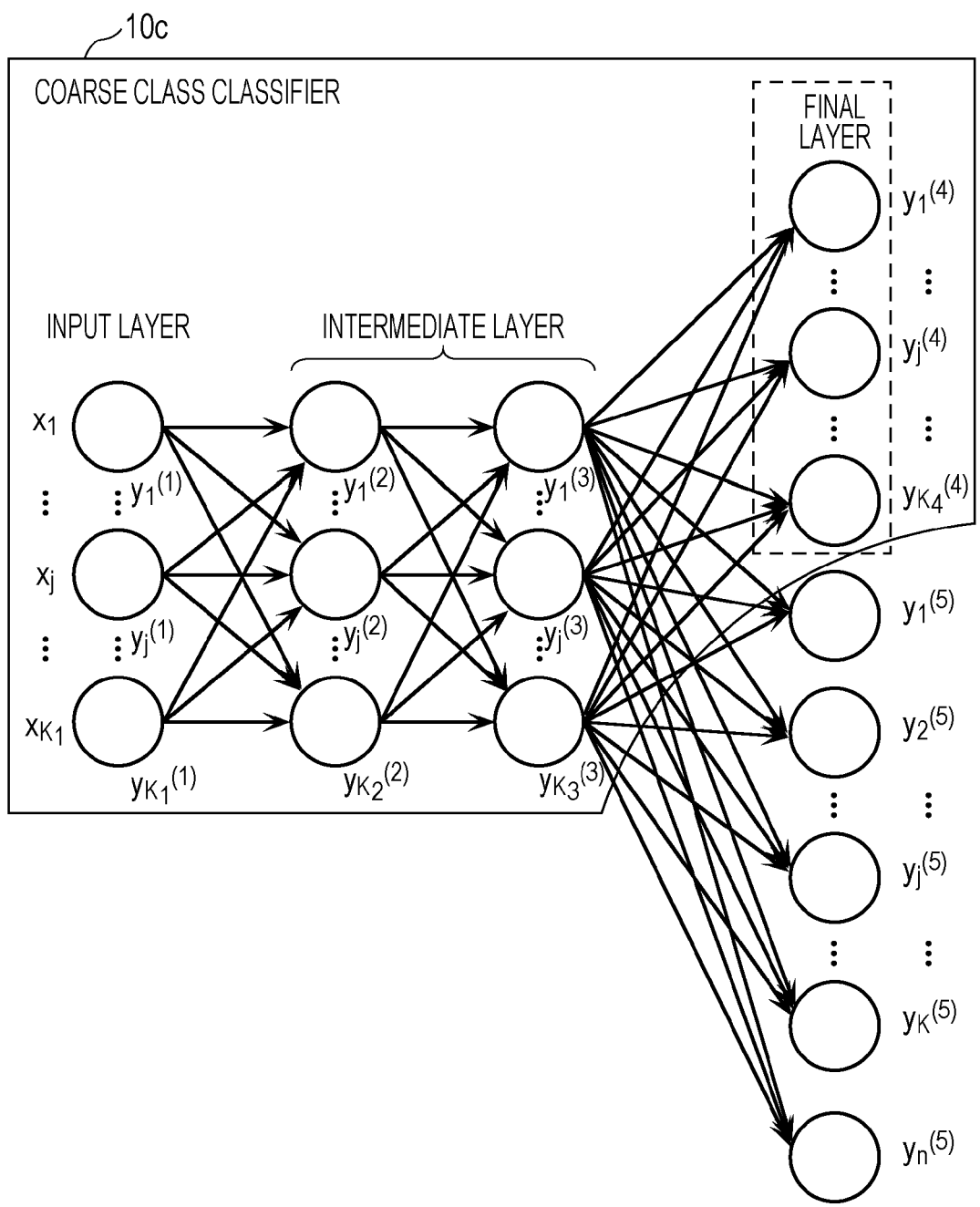
FIG. 12A is a diagram illustrating an example of a first neural network used as a coarse class classifier according to the second modification.
Figure 12B:
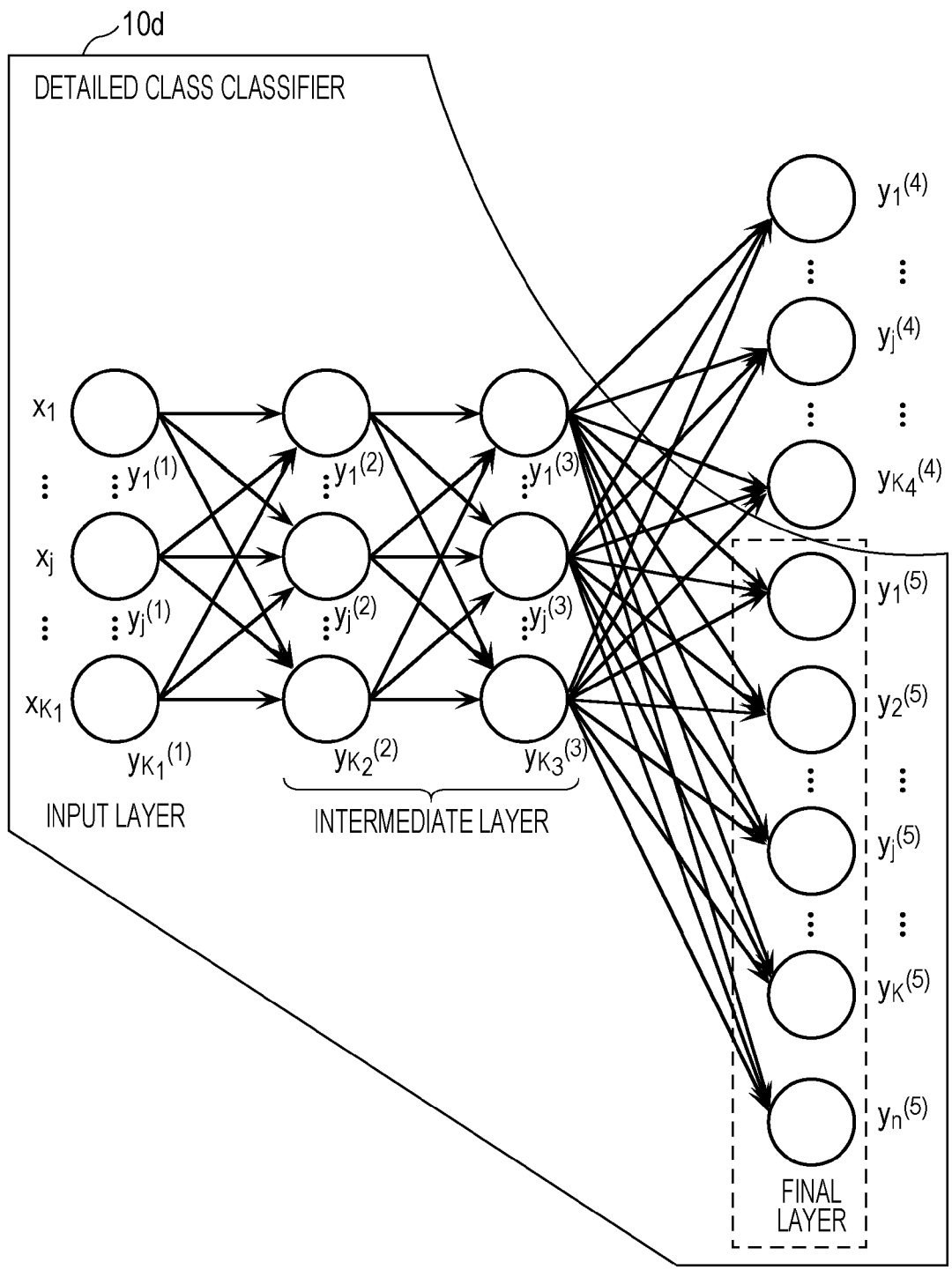
FIG. 12B is a diagram illustrating an example of a second neural network used as a detailed class classifier according to the second modification.

FIG. 11 is a diagram illustrating an example of a third neural network according to the second modification. FIG. 12A is a diagram illustrating an example of a first neural network 10c used to realize a coarse class classifier according to the second modification. FIG. 12B is a diagram illustrating an example of a second neural network 10d used to realize a detailed class classifier according to the second modification. Elements similar to those in FIG. 2A or FIG. 2B are denoted by similar reference symbols, and a further detailed description thereof is omitted.

In the multi-stage learning on the classifier 10 performed by the learning system 1, coarse class learning is performed using the coarse class classifier 10c, and detailed class learning is performed using the detailed class classifier 10d.

In the present modification, the coarse class classifier 10c and the detailed class classifier 10d are realized using the third neural network such as that illustrated in FIG. 11. The final layer of the third neural network includes neurons whose number is equal to or greater than the sum of the number of coarse classes and the number of detailed classes.

As illustrated in FIG. 12A, the coarse class classifier 10c is realized using the first neural network that is realized fully using the layers other than the final layer of the third neural network shown in FIG. 11 and using part of the final layer. More specifically, the first neural network used to realize the coarse class classifier 10c is given by the third neural network but in the final layer thereof, particular neurons whose number is equal to the number of coarse classes are selected from the neurons of the final layer and only the selected neurons are used.

The second neural network used to realize the detailed class classifier 10d is given, as illustrated in FIG. 12B, by the third neural network shown in FIG. 11 but the layers other than the final layer and part of the final layer remaining without being used in the final layer of first neural network are used. More specifically, the second neural network used to realize the detailed class classifier 10d is given by the third neural network but in the final layer thereof, particular neurons which are different from the neurons employed as the neurons in the final layer of the first neural network and whose number is equal to the number of detailed classes are used.

Learning Process by Learning System 1

In the present modification, the learning system 1 performs a learning process such as that described above with reference to FIG. 5 using the coarse class classifier 10c and the detailed class classifier 10d configured in the above-described manner.

More specifically, the learning process according to the present modification includes, before the learning process on the coarse class classifier 10c in step S1, an additional step of designing the third neural network so as to include, in its final layer, as many neurons as the sum of the number of coarse classes and the number of detailed class, or more, as illustrated, for example, in FIG. 11.

For the purpose described above, in the present modification, the learning system 1 designs the first neural network in step S1 in which the first neural network used to realize the coarse class classifier 10c is given by the third neural network but in the final layer thereof, particular neurons whose number is equal to the number of coarse classes are selected and only the selected neurons are used thereby achieving the first neural network whose final layer includes as many neurons as there are coarse classes generated based on contents of labels indicating detailed classes.

Thereafter, the learning system 1 of the present modification designs the second neural network in step S2 in which the second neural network used to realize the detailed class classifier 10d is given by the third neural network but in the final layer thereof, particular neurons which are different from the neurons employed as the neurons in the final layer of the first neural network and whose number is equal to the number of detailed classes are used thereby achieving the second neural network that is the same as the first neural network made to perform the learning in step S1 except that the neurons in the final layer is changed by the neuron whose number is equal to the number of detailed classes.

Second Embodiment

In the first embodiment described above, the weight for the final layer of the second neural network is set, by way of example but not limitation, to a random number. Alternatively, the weight for the final layer of the second neural network may be set based on the weight for the final layer of the first neural network made to learn the coarse classes and the relationship between the detailed classes and the coarse classes. This alternative setting is described below focusing on differences from the first embodiment.

Configuration of Learning System 1B

Figure 13:
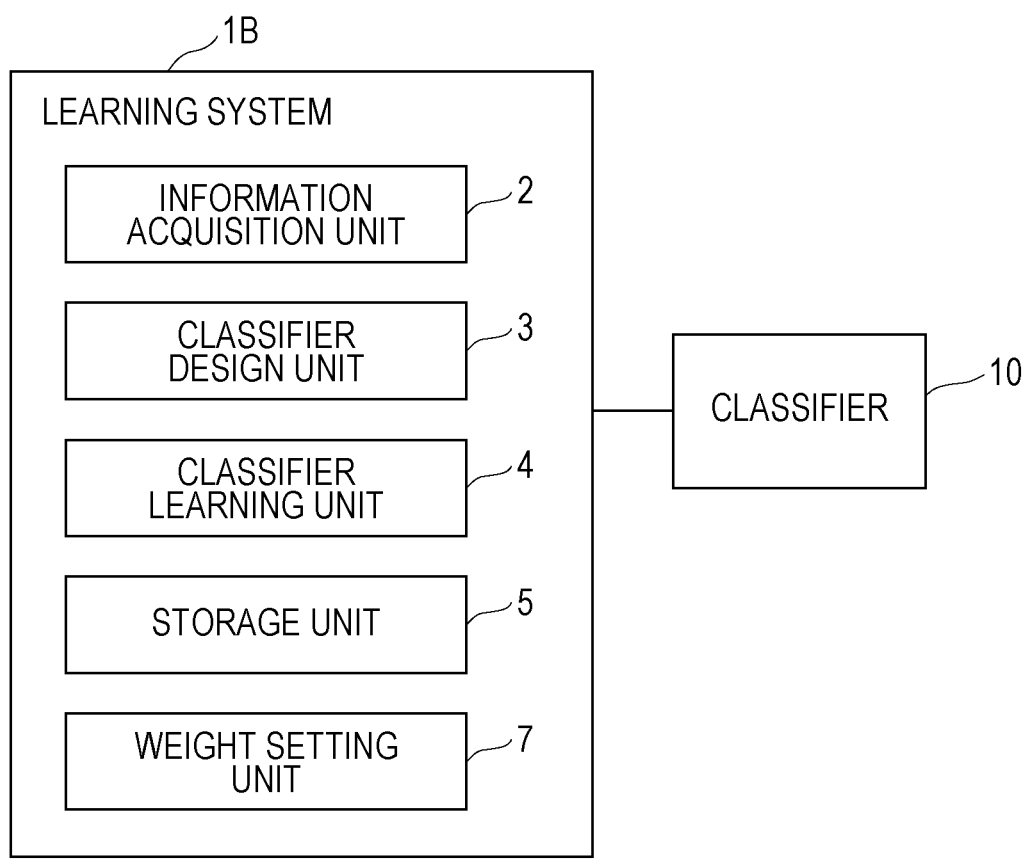
FIG. 13 is a block diagram illustrating an example of a configuration of a learning system according to a second embodiment.
Figure 14:
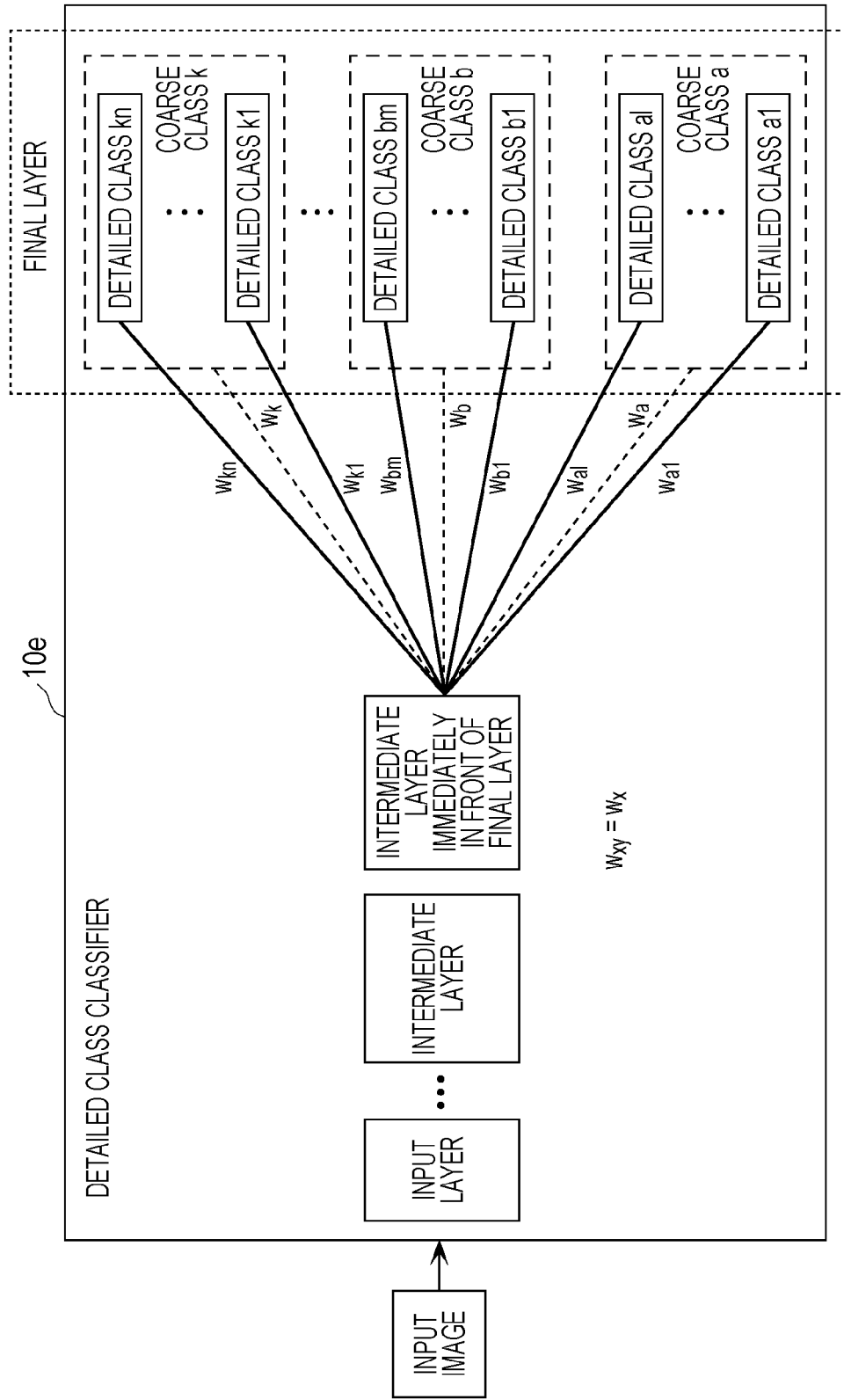
FIG. 14 is a diagram illustrating a configuration of a detailed class classifier used in a learning process performed by the learning system according to the second embodiment.

FIG. 13 is a block diagram illustrating an example of a configuration of a learning system 1B according to a second embodiment. FIG. 14 is a diagram illustrating a configuration of a detailed class classifier 10e used in a learning process performed by the learning system 1B according to the second embodiment. In FIG. 14, a, b, k, a1 to a1, b1 to bm, and k1 to kn are positive integers. In FIG. 14, elements similar to those in FIG. 1 are denoted by similar reference symbols, and a further description thereof is omitted.

The learning system 1B shown in FIG. 13 includes an information acquisition unit 2, a classifier design unit 3, a classifier learning unit 4, a storage unit 5, and a weight setting unit 7. The learning system 1B shown in FIG. 13 is different from the learning system 1 shown in FIG. 1 in that the weight setting unit 7 is additionally provided.

Based on the weight for the final layer of the first neural network acquired from the coarse class classifier 10a made to learn the coarse classes and based on the relationship such as an inclusion relationship between the detailed classes and the coarse classes, the weight setting unit 7 calculates the weight for the new final layer, that is, the weight for the final layer of the second neural network. More specifically, the weight setting unit 7 determines the weight as follows. The first weight for the final layer of the first neural network indicating the coupling efficiency between the final layer of the first neural network of the coarse class classifier 10*a* obtained via the process of learning the coarse classes and the layer immediately in front of the final layer is divided proportionally in accordance with the relationship between the plurality of coarse classes and the plurality of detailed classes included in the plurality of coarse classes. Thereafter, using the value calculated in the above-described manner, the weight setting unit 7 sets the second weight for the final layer of the second neural network indicating the coupling efficiency between the final layer of the second neural network and the layer immediately in front of the final layer.

For example, FIG. 14 shows Wa, Wb, . . . , Wk as first weights, and Wa1 to Wal, Wb1 to Wbm, . . . , Wk1 to Wkn as second weights. Furthermore, FIG. 14 also shows a plurality of coarse classes (coarse class a, coarse class coarse class k) output from neurons of the final layer of the first neural network, and a plurality of detailed classes (detailed classes a1 to al, detailed classes b1 to bm, . . . , detailed classes k1 to kn) output from neurons of the final layer of the second neural network.

That is, the weight setting unit 7 obtains the first weights for the final layer of the first neural network via the learning on the first neural network in terms of the coarse classes, that is, the weight setting unit 7 obtains first weights Wa, Wb, . . . , Wk for the neurons in the final layer that respectively output coarse class a, coarse class b, . . . , coarse class k. Thereafter, in the detailed class classifier 10*e*, the plurality of coarse classes (coarse class a, coarse class b, . . . , coarse class k) are replaced with the plurality of detailed classes (detailed classes a1 to al, detailed classes b1 to bm, . . . , detailed classes k1 to kn) included in the plurality of coarse classes (coarse class a, coarse b, . . . , class coarse class k). In this process, the weight setting unit 7 calculates values by proportionally dividing the acquired first weights Wa, Wb. Wk by the number (I, m, . . . , n) of detailed classes included in the corresponding coarse classes based on the relationship among the plurality of detailed classes (detailed classes a1 to al, detailed classes b1 to bm, detailed classes k1 to kn) included in the plurality of coarse classes (coarse class a, coarse class b, . . . , coarse class k).

Learning Process by Learning System 1B

Figure 15:
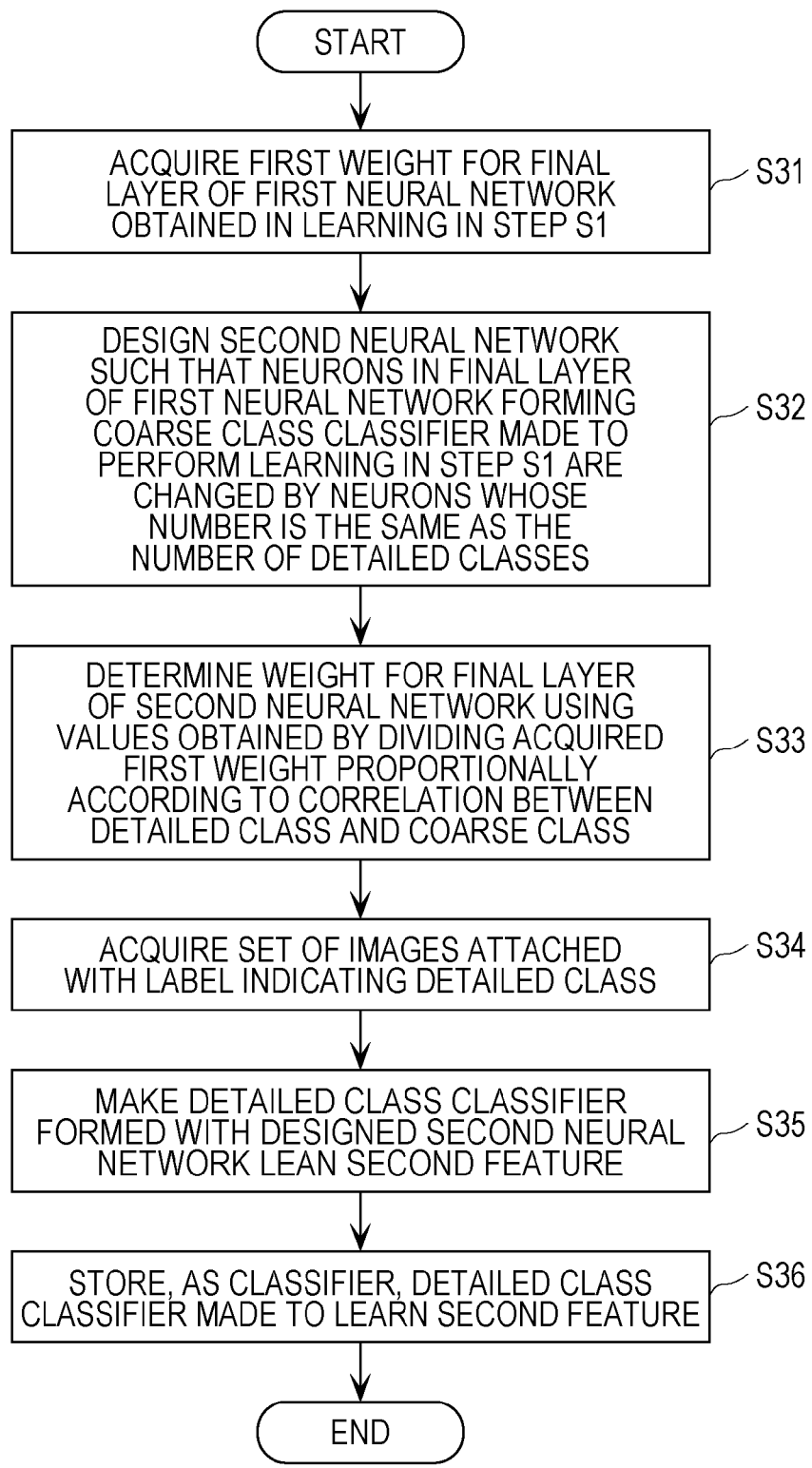
FIG. 15 is a flow chart illustrating an example of a detailed process of detailed class learning according to the second embodiment.

A learning process performed by the learning system 1B configured in the above-described manner is described below. The two-stage learning process performed by the learning system 1B is similar to that described above with reference to FIG. 5, and the detailed process of the coarse class learning (step S1) is similar to that described above with reference to FIG. 7, and thus further descriptions thereof are omitted. The following description is focused on differences from the first embodiment. FIG. 15 is a flow chart illustrating an example of a detailed class learning (step S2) according to the second embodiment. In FIG. 15, step S32, steps S34 to S36 are similar to steps S21 to S24 described above with reference to FIG. 8, and thus a further description thereof is omitted.

First, in step S31, the learning system 1B controls the weight setting unit 7 to acquire the first weights for the final layer of the first neural network used to realize the coarse class classifier 10*a*, wherein the first weights are obtained when the coarse class classifier 10*a* is made to learn the coarse classes in step S10.

In step S33, the learning system 1B sets the weight setting unit 7 in terms of the second weights for the final layer of the second neural network used to realize the detailed class classifier 10*b* by using the values obtained by proportionally dividing the acquired first weights according to the relationship between the detailed classes and the coarse classes. Here the relationship between the detailed classes and the coarse classes is the relationship between the plurality of coarse classes and the plurality of detailed classes included in the plurality of coarse classes. In the specific example described above, the relationship is the number of detailed classes included in each coarse class.

Effects

As described above, the present embodiment makes it possible to realize the method of learning the classifier capable of performing high-accuracy image recognition without reducing a processing speed in the image recognition compared with a processing speed of the conventional technique.

The learning method according to the second embodiment, as described above, includes an additional process, in addition to the process of the learning method according to the first embodiment, to set the weights for the final layer of the detailed class classifier 10*b* used in the detailed class classification process, based on the weights for the final layer of the coarse class classifier 10*a* obtained via the coarse class classification process in the learning process. This makes it possible to improve the accuracy of the image recognition by the classifier 10 and the processing speed of the image recognition.

The learning method according to the present disclosure has been described above with reference to the first embodiment, the first modification, the second modification, and the second embodiment. Note that there is no particular restriction on an entity or an apparatus that performs each process. Processes may be performed by a processor or the like disposed in a particular local apparatus or by a cloud server or the like disposed at a location different from the location of the local apparatus, as described below.

In addition to the above, the present disclosure may be realized in many other ways, some examples of which are described below.

(1) A specific example of the apparatus described above is a computer system including a microprocessor, a ROM, a RAM, a hard disk unit, a display unit, a keyboard, a mouse, and the like. A computer program is stored in the RAM or the hard disk unit. The microprocessor operates according to the computer program such that each apparatus achieves its function. The computer program includes a plurality of instruction codes each indicating an instruction to be executed by the computer to achieve a particular function.

(2) Part or all of constituent elements of the apparatus described above may be realized with one system LSI (Large Scale Integration). The system LSI is a super-multifunction LSI produced by integrating a plurality of parts on a single chip. More specifically, the system LSI may be a computer system configured using a microprocessor, a ROM, a RAM, and the like. In the RAM, a computer program is stored. The microprocessor operates according to the computer program such that the system LSI achieves its functionalities.

(3) Part or all of the constituent elements of the apparatus described above may be implemented in the form of an IC card attachable to the apparatus or in the form of a single module. The IC card or the module is a computer system including a microprocessor, a ROM, a RAM, and so on. The IC card or the module may include the super-multifunction LSI described above. In the IC card or the module, the microprocessor operates according to the computer program thereby achieving the function of the IC card or the module. The IC card or the module may be configured so as to be resistant against tampering.

(4) The present disclosure may be implemented as a method. The method may be realized by a computer program that is to be executed by a computer or the method may be realized by a digital signal associated with the computer program.

(5) The present disclosure may be implemented by a computer readable storage medium, such as a flexible disk, a hard disk, a CD-ROM disk, an MO disk, a DVD disk, a DVD-ROM disk, a DVD-RAM disk, a BD (Blu-ray (registered trademark) Disc), a semiconductor memory, or the like in which the computer program or the digital signal is stored. Alternatively, the present disclosure may be implemented by the digital signal stored in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and the storage medium may be transported, or the program or the digital signal may be transferred via the network or the like thereby allowing the present invention to be implemented in another computer system.

(6) The details of the above-described embodiments and the modifications may be combined.

The present disclosure may be applied to a method of learning a classifier that classifies an image and a recording medium therefor, and more particularly, to an image capturing apparatus such as a digital camera, a movie camera, a monitor camera, an in-vehicle camera, a wearable camera, and the like in which an object recognition method or system is implemented to analyze an image to accurately recognize what kind of object is included in the image.

What is claimed is:

1. A method of learning a classifier for classifying an image, comprising:
    performing a first process, in which a coarse class classifier, configured with a first neural network, classifies a plurality of images, comprising a set of images each having attached a label indicating a detailed class into a plurality of coarse classes including a plurality of detailed classes and then learns a first feature that is a common to each of the coarse classes; and
    performing a second process in which a detailed class classifier classifies the set of images into a plurality of detailed classes and then learns a second feature that is common to each of the detailed classes, the detailed class classifier configured with a second neural network that is the same in terms of layers other than a final layer, and is different in terms of the final layer, from the first neural network that performs the learning in the first process,
    wherein at least one of the first process and the second process is performed by a processor.

2. The method according to claim 1, wherein
    the first process includes a first design process and a first learning process, the first design process including designing the first neural network to include as many neurons in the final layer as there are coarse classes generated based on contents of the labels indicating the respective detailed classes, the first learning process including making the coarse class classifier, configured with the designed first neural network, acquire the set of images and learn the first feature,
    the second process includes a second design process and a second learning process, the second design process including designing the second neural network such that the neurons in the final layer of the first neural network that performs the learning in the first process are changed by a number of neurons that is the same as the number of detailed classes, and the resultant neural network is employed as the second neural network, the second learning process including making the detailed class classifier, configured with the designed second neural network, acquire the set of images and learn the second feature.

3. The method according to claim 2, wherein, in the second design process, the second neural network is designed such that the neurons in the final layer of the first neural network that performs the learning in the first learning process are replaced with a number of neurons that is the same as the number of detailed classes and the resultant neural network is employed as the second neural network.

4. The method according to claim 2, wherein
    each of the detailed class classifier and the coarse class classifier is formed using a third neural network,
    wherein the method further comprises a third design process before the first process, the third design process including designing the third neural network such that a final layer of the third neural network includes a number of neurons that is equal to or greater than a sum of the number of coarse classes and the number of detailed classes,
    wherein in the first design process, the first neural network is given by the third neural network, except that, in the final layer of the third neural network, a number of particular neurons that is equal to the number of coarse classes are selected and only the selected neurons are used to design the first neural network to include as many neurons in the final layer as there are coarse classes generated based on contents of the labels indicating the respective detailed classes, and
    in the second design process, the second neural network is given by the third neural network, except that, in the final layer of the third neural network, a number of particular neurons, which are different from the neurons employed as the neurons in the final layer of the first neural network, and that is equal to the number of detailed classes, are used to design the second neural network obtained by changing the neurons in the final layer of the first neural network that performs the learning in the first process with a number of neurons that is equal to the number of detailed classes.

5. The method according to claim 2, wherein the second design process further includes setting a weight of the final layer of the second neural network to a random number, the weight indicating a coupling efficiency between the final layer of the second neural network and a layer immediately in front of the final layer of the second neural network.

6. The method according to claim 2, wherein the second design process further includes setting a second weight of the final layer of the second neural network based on a first weight of the final layer of the first neural network, the first weight indicating a coupling efficiency, obtained via the learning in the first learning process, between the final layer of the first neural network and the layer immediately in front of the final layer of the first neural network, the second weight indicating a coupling efficiency between the final layer of the second neural network and the layer immediately in front of the final layer of the second neural network, the second weight being determined by proportionally dividing the first weight according to a relationship between the plurality of coarse classes and the plurality of detailed classes included in the plurality of coarse classes.

7. The method according to claim 1, further comprising storing, as the classifier, the detailed class classifier that learns the second feature in the second process.

8. The method according to claim 1, wherein the first process further includes generating the plurality of coarse classes based on contents of the labels attached to respective images in the plurality of images.

9. The method according to claim 1, wherein the first process further includes generating the plurality of coarse classes based on a similarity of each image in the plurality of images.

10. The method according to claim 1, further comprising performing a third process, in which a third coarse class classifier, configured with a third neural network, classifies the set of images, into a plurality of third coarse classes including a plurality of detailed classes and then learns a third feature that is common to each third coarse class of the plurality of third coarse classes, wherein the first process includes a first learning process, in which the detailed class classifier, configured with the first neural network that is the same in terms of layers other than the final layer, and is different in terms of the final layer from the third neural network that performs the learning in the third process, classifies the set of images into the plurality of coarse classes and learns the first feature of each detailed class, and wherein each coarse class in the plurality of coarse classes includes a plurality of third coarse classes and includes a plurality of detailed classes included in the plurality of third coarse classes.

11. A non-transitory computer-readable recording medium storing a program for learning a classifier that classifies an image, the program causing a computer to execute:

performing a first process, in which a coarse class classifier, configured with a first neural network, classifies a plurality of images, comprising a set of images each having attached a label indicating a detailed class, into a plurality of coarse classes including a plurality of detailed classes and then learns a first feature that is a common to each of the coarse classes; and performing a second process, in which a detailed class classifier classifies the set of images into a plurality of detailed classes and learns a second feature that is common to each of the detailed classes, the detailed class classifier configured with a second neural network that is the same in terms of layers other than a final layer, and is different in terms of the final layer, from the first neural network that performs the learning in the first process.

* * * * *